United States Patent
Hannity

Patent Number: 5,312,141
Date of Patent: May 17, 1994

[54] ADAPTER FOR DISCHARGE LINES

[75] Inventor: James Hannity, Tacoma, Wash.

[73] Assignee: R. G. Andrew, Tacoma, Wash.

[21] Appl. No.: 549,393

[22] Filed: Jul. 6, 1990

Related U.S. Application Data

[63] Continuation of Ser. No. 97,602, Sep. 8, 1987, abandoned, which is a continuation of Ser. No. 506,199, Jun. 29, 1983, abandoned.

[51] Int. Cl.⁵ ............................................. F16L 27/00
[52] U.S. Cl. .................................. 285/302; 285/341; 285/155; 285/151
[58] Field of Search ............... 285/155, 157, 151, 232, 285/298, 341, 152, 150, 302

[56] References Cited

U.S. PATENT DOCUMENTS

| | | | |
|---|---|---|---|
| 160,305 | 3/1875 | Chapman | 285/177 X |
| 268,467 | 12/1882 | Dunlap | 285/151 |
| 425,553 | 4/1890 | Smith | 285/156 |
| 714,508 | 11/1902 | Moser | 285/156 X |
| 782,552 | 5/1904 | Glauber | 285/298 X |
| 2,452,278 | 10/1948 | Woodling | 285/348 |
| 2,749,148 | 4/1953 | Schneiderman | 285/155 X |
| 2,834,615 | 4/1954 | Bleakley | 285/155 |
| 3,074,747 | 1/1963 | Boughton | 285/342 |
| 3,381,982 | 5/1968 | Elek | 285/177 X |
| 3,695,640 | 10/1972 | Clague | 285/341 X |
| 3,831,983 | 8/1974 | Stickler | 285/177 X |
| 3,908,208 | 9/1975 | McIlroy | 285/157 X |
| 4,776,618 | 10/1988 | Baree | 285/341 |

OTHER PUBLICATIONS

Erven, L. W., Fire Apparatus and Procedures, 2nd Ed., 1974 Glencoe Press, London p. 206.
Eng. Drawing and Graphic Technology 12th Ed., French & Vierck McGraw-Hill, New York, N.Y. 1978 pp. 604, A71.

*Primary Examiner*—Eric K. Nicholson
*Attorney, Agent, or Firm*—Kenneth S. Kessler

[57] ABSTRACT

An adaptable coupling mechanism for discharge lines is disclosed. The adaptable coupling can be placed into alignment with discharge lines despite the fact that the discharge lines are set at varying distances from one another. Once in alignment, the users can secure the coupler to the discharge lines, thereby providing the flow of liquid through the discharge lines and coupler to a single, larger line.

6 Claims, 3 Drawing Sheets

ADAPTER FOR DISCHARGE LINES

This application is a continuation of application Ser. No. 07/097,602, filed Sep. 8, 1987, now abandoned, which is a continuation application of prior application Ser. No. 06/506,199, filed Jun. 29, 1983, now abandoned.

BACKGROUND OF THE INVENTION

It is well recognized that speed in setting up to battle a fire is essential. Presently, when certain discharge lines are necessarily coupled to a larger diameter fire hose, a number of steps are necessary.

In prior art, certain coupling mechanisms have been invented for handling certain non-emergency type uses. In U.S. Pat. No. 1,674,562 a coupling for traps is disclosed. In this configuration, two curved pipes are formed in a union with a vent pipe. In this invention, however, the two curved pipes could not be either extended or retracted and are permanently fixed.

Similarly, in U.S. Pat. No. 1,708,380 by Deacon, a similar "Y" coupling is disclosed. However, as in the previous example, the "Y" sections of pipe cannot be adapted to change their position in relation to each other.

In the present invention, however, since the pipes are slidably positioned within the housing of the necks extending from the coupler, a broad range of discharge lines can be hooked up. Thus, if a fire district has non-uniform discharge lines on different fire trucks, or if adaptations are necessary to fit into the discharge lines of a particular truck, the users can quickly adapt to the various discharge lines.

SUMMARY OF THE INVENTION

The present invention is economical and, most important, a time saving device. Use of the invention allows a fire fighter to quickly attach a conduit between two discharge outlets from a fire truck to a large fire hose. The simplicity of the invention permits the user to slide the connecting pipes into place and quickly secure the coupling device and fire hose into place.

Because the invention is adjustable to various discharge systems, fire districts need not order spare models of coupling devices of varying designs.

Damage or loss of the invention is easily remedied by use of another copy of the device borrowed from another truck. One spare unit will replace damage or loss to any one coupling device or loss to any one coupling device in the district, regardless of the truck discharge system involved.

DETAILED DESCRIPTION OF THE DRAWINGS

Figure 1:
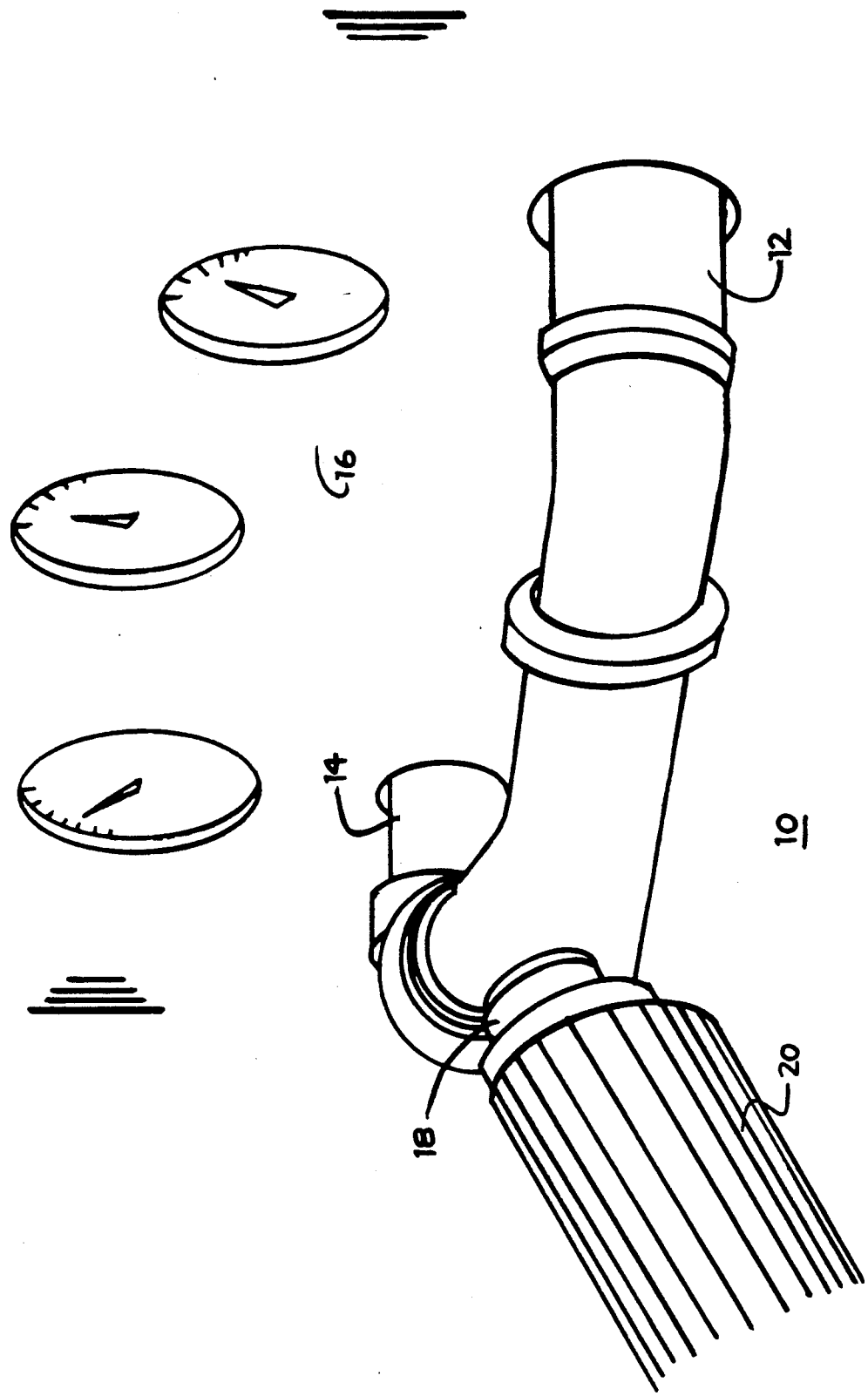
FIG. 1 is a perspective view of the coupler attached to a fire truck.
Figure 2:
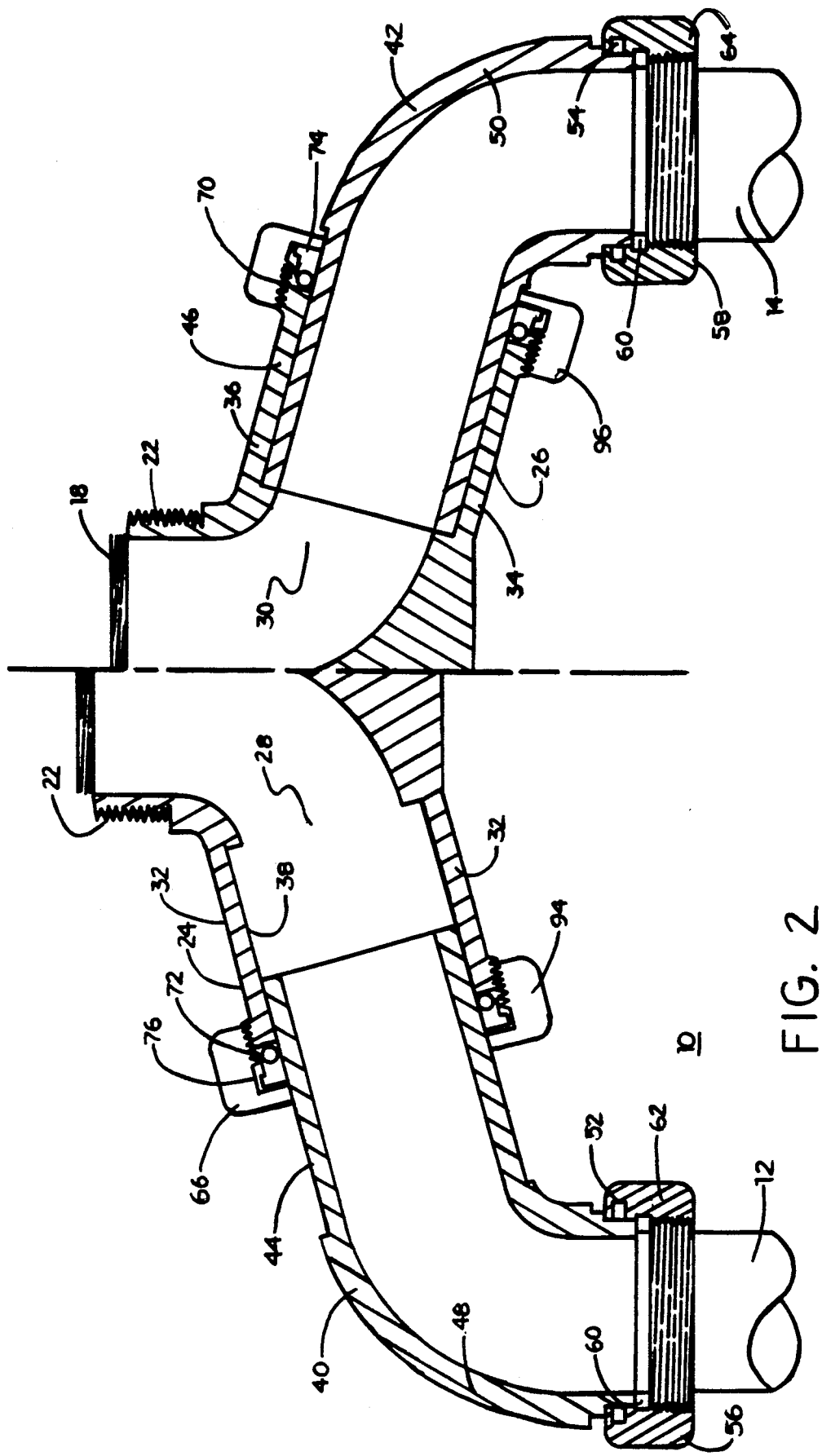
FIG. 2 is a side cutaway view of the coupler with the adapting pipes set at different positions.

In FIG. 1, the adapter 10 is split in two with each side of the adapter set for different widths between the discharge hoses. As illustrated in FIG. 2, the adapter includes a coupler 22 from which extend two necks 24 and 26.

In the preferred embodiment, two necks extend from the coupler 22. However, it is to be understood that three or more necks could extend from an adapter using the same principle as set forth in this application. Within the inner diameter of each of the two necks 24 and 26 are channels 28 and 30. The channels 28 and 30 provide for the flow of water or any other liquid. As set forth in FIG. 2, the necks extend from the adapter at a uniform angle.

Each of the forward ends of the necks includes a cylindrical housing 32 and 34 within the inner diameter of the walls 36 and 38 of the necks 24 and 26. Positioned within the cylindrical housings 32 and 34 are slidable coupling pipes 40 and 42. Each of the slidable coupling pipes 40 and 42 have an engaging wall 44 and 46. The engaging wall 44 as set forth in FIG. 2 in inserted within the cylindrical housing 30. The engaging wall is of a diameter such that it can be slid within the cylindrical housing to the desired position. The lengths of the engaging walls 44 and 46 are of the same length of the cylindrical housings 32 and 34.

To better illustrate the adaptability of the adapter 10, the slidable coupling pipes 40 and 42 are set at varying positions within the cylindrical housings 32 and 34. Thus, within neck 26, the slidable coupling pipe 42 is positioned at a point entirely within the neck 26. Alternatively, the slidable coupling pipe 42 is positioned only part way within neck 24. As is illustrated, the slidable coupling pipes can be set at varying positions.

Positioned forward of the engaging walls 44 and 46 is curved wall 48 and 50. The curved wall bends from the engaging wall to a position whereby when the slidable coupling pipes 40 and 42 are inserted within the cylindrical housings 32 and 34, the forward edge of the curved wall is parallel to the face of the discharge orifice of the adapter 10.

At the fare end of the slidable coupling pipe 38 and 40, are external threads 52 and 54. The external threads allow for the coupling sleeves 56 and 58 to be tightened around the diameter of the curved walls 48 and 50. The coupling sleeve 56 and 58 thus threads around the end of the slidable coupling pipe 40 and 42.

The coupling sleeve includes a seal ring 60, which surrounds the outer diameter of the slidable coupling pipe 40 and 42. The coupling sleeve 56 and 58 includes within its diameter internal threads 62 and 64, which allows for the positioning of the coupling sleeve about discharge pipes 12 and 14, such as those found in the illustration, FIG. 1, extending from a fire engine pump system.

Figure 3:
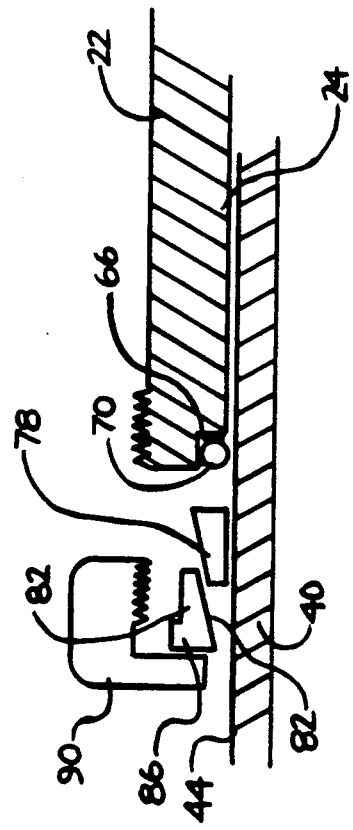
FIG. 3 is a side view of the threaded seal retainer nut before being applied to the heck, thereby allowing the O-ring, tapered gripping ring, and tapered drive ring to fit loosely about the engaging wall.

The present invention secures the slidable coupling pipes 40 and 42 to the necks 24 and 26 as illustrated in FIG. 3. The outer circumference of the necks 24 and 26 include notches 66 and 68 which allow for the positioning of O-rings 70 and 72. The O-rings 70 and 72 loosely abut with the engaging walls 44 and 46.

Loosely fitted about the engaging walls 44 and 46 are tapered gripping rings 74 and 76. The tapered gripping rings include splits 78 and 80, thereby allowing for the reduction of the diameter of the ring which in turn grips the engaging walls 44 and 46. The tapered gripping rings 78 and 80 include serrations 82 on their inner surface.

The outer circumference of the tapered gripping rings 78 and 80 are tapered to interface with the tapered inner circumference of the tapered drive rings 82 and 84.

The tapered drive rings include tapered base platforms 86 and 88. The platforms 86 and 88 abut the outer circumference of the serrated collars. Rising from the platforms 86 and 88 are sidewalls 90 and 92. The sidewalls 90 and 92 are capable of interfacing with the threaded seal retainer nut 94 and 96.

Figure 4:
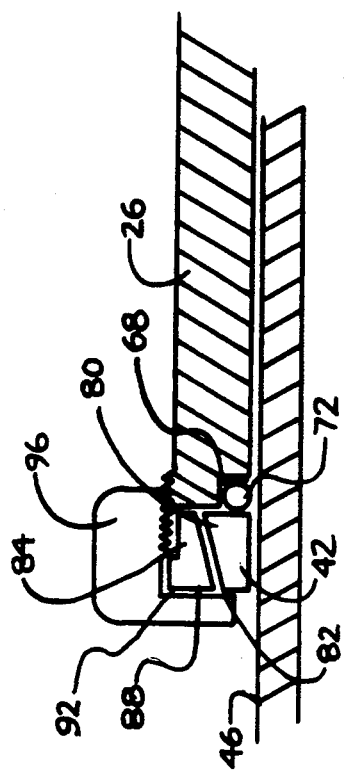
FIG. 4 is a side view with the engaging wall and neck sealed.

As illustrated in FIG. 4, the threaded seal retainer nut is threaded onto the outer circumference of the necks 22 and 24. As the threaded seal retainer 44 continues to thread about the necks, the seal retainer pushes against the sidewalls 90 and 92 which in turn forces the platforms 86 and 88 securely over the tapered gripping rings 76 and 78. Due to the continuing pressure of the advancing threaded seal retainer nut, the gripping rings come into abutment with the O-rings 70 and 72.

Due to the pressure of the gripping rings resultant from the advancing threaded seal retainer nut pressing against the O-rings, the O-rings flatten out and seal any water or liquid that might attempt to escape between the necks 24 and 26 and engaging walls 42 and 44. Due to the splits of the gripping rings 76 and 78, the gripping rings 76 and 78 are forced to constrict and grip the engaging walls 44 and 46. Having gripped these walls, the necks 24 and 26 are sealed with the engaging walls 42 and 44. FIG. 4 illustrates the seal established with threaded seal retainer nut 94 tightened.

The threaded seal retainer not only seals out the escape of any liquid, but prevents expansion and bowing by the engaging walls 42 and 44. This proves essential due to the high pressures experienced by the surging water force.

To further illustrate the invention, the steps towards use will be outlined.

If as in the preferred embodiment, the coupler is to be attached to a fire pump system, the user merely grabs hold of the adapter 10. The adapter 10 is put into rough alignment with the two discharge pipes 12 and 14. Then, the coupling sleeves 56 and 58 are slid into exact alignment with discharge pipes 12 and 14. Once in alignment, the user merely screws the coupling sleeve 56 and 58 over the discharge pipe 12 and the pipe is held in position in relation to the adapter 10. The user then makes any fine adjustments needed in positioning the slidable coupling pipes within the cylindrical housing so that the coupling sleeves 56 and 58 are in perfect alignment with the discharge pipe 14. When in perfect alignment, the coupling sleeves are screwed onto the discharge pipe 14. Once screwed on, the user then screws on the threaded seal retainer nuts thereby establishing a seal between the necks and coupling pipes. Finally, the adapter is held steady so that the user may screw on a fire hose over the external threads of the discharge portion of the adapter 10. Thus, pipes of approximately 2½" diameter have coupled themselves to the fire hose of approximately 5 inches in diameter. It is to be understood that a number of different diameters will work equally well with the disclosure set forth herein.

I claim:

1. An adapter for coupling with discharge lines of varying distance between the discharge lines comprising:

a coupler with an orifice
a pair of hollow necks affixed to the coupler;
a housing extending from each neck;
a pair of curved pipes wherein the curved pipes are curved at an angle such that when the curved pipes are inserted within the respective housing, the planes defined by outlets of the curved pipes at the opposite end of the curved pipes inserted within the housings lie in the same plane and are capable of being attached to outside lines;
a cylindrical extension from the curved pipes, said cylindrical extensions having a mating diameter with the housings capable of sliding within and without the housings;
a "O" ring positioned within the circumference of the forward edge of the housing capable of interfacing with cylindrical extension;
a gripping ring surrounding said cylindrical extension, said gripping ring having a tapered circumference;
a drive ring having an interior tapered circumference capable of abutting the tapered outer circumference of the gripping ring; and
a locking ring capable of holding the drive ring and gripping ring in a secure position about the cylindrical extension of the curved pipes; and
a means of affixing the locking ring to the neck; and
a means of attaching the pair of curved pipes to discharge lines.

2. The adapter of claim 1, wherein the locking ring comprises:

a cylindrical nut capable of attaching to the outer circumference of the neck; and
a wall extending from the cylindrical nut capable of abutting the drive ring and gripping ring.

3. The adapter of claim 2 wherein the means for attaching the pair of curved pipes comprises threads positioned on the outer diameter of said pipes.

4. The adapter of claim 3 wherein the coupler includes a neck capable of attaching to various diameter heads.

5. An adapter for adapting two discharge lines into one larger diameter line for use on discharge lines of equipment such as fire trucks comprising:

a coupler with an orifice;
a pair of hollow necks with housings extending from said necks affixed to the coupler;
a pair of curved pipes wherein the curved pipes are curved at an angle such that the curved pipes are approximately in the same plane and are capable of being attached to outside lines;
a cylindrical extension from the curved pipes, said cylindrical extensions capable of sliding in and out of the housing;
an "O" ring positioned within the circumference of the forward edge of the housing capable of interfacing with the cylindrical extension;
a gripping ring surrounding said cylindrical extension, said gripping ring having a tapered out circumference;
a drive ring having an interior tapered circumference capable of abutting the tapered outer circumference of the gripping ring; and
a locking ring capable of holding the drive ring and gripping ring in a secure position about the cylindrical extension of the curved pipes; and a means of affixing the locking ring to the neck; and a means of attaching the pair of curved pipes to discharge lines.

6. The adapter of claim 5 wherein the means for slidably positioning the curved pipes within the necks comprise:

a housing within the inner diameter of said necks; and a cylindrical extension from the curved pipes, said cylindrical extensions capable of sliding in and out of the housing.

* * * * *